US008655179B2

United States Patent
Al-Kadi et al.

(10) Patent No.: US 8,655,179 B2
(45) Date of Patent: Feb. 18, 2014

(54) SYSTEM OF DEVICES OF WHICH SOME INCLUDE AN INFARED REMOTE CONTROL INTERFACE

(75) Inventors: Ghiath Al-Kadi, Eindhoven (NL); Ajay Kapoor, Wijchen (NL)

(73) Assignee: NXP, B.V., Eindhoven (NL)

( * ) Notice: Subject to any disclaimer, the term of this patent is extended or adjusted under 35 U.S.C. 154(b) by 478 days.

(21) Appl. No.: 12/937,834

(22) PCT Filed: Apr. 15, 2009

(86) PCT No.: PCT/IB2009/051573
§ 371 (c)(1),
(2), (4) Date: Oct. 14, 2010

(87) PCT Pub. No.: WO2009/128038
PCT Pub. Date: Oct. 22, 2009

(65) Prior Publication Data
US 2011/0044690 A1    Feb. 24, 2011

(30) Foreign Application Priority Data

Apr. 16, 2008   (EP) ...................................... 08103565

(51) Int. Cl.
*H04B 10/00* (2013.01)
*H04B 10/112* (2013.01)
(52) U.S. Cl.
CPC ................................ *H04B 10/1125* (2013.01)
USPC ............ 398/128; 398/106; 398/107; 398/112
(58) Field of Classification Search
USPC ............................. 398/66, 106, 107, 112, 128
See application file for complete search history.

(56) References Cited

U.S. PATENT DOCUMENTS

| 6,111,677 | A | 8/2000 | Shintani et al. | |
|---|---|---|---|---|
| 7,339,907 | B2 * | 3/2008 | Liscano et al. | 370/329 |
| 7,359,989 | B2 * | 4/2008 | Orava et al. | 709/245 |
| 7,386,238 | B2 * | 6/2008 | Ternullo et al. | 398/118 |
| 7,450,852 | B2 * | 11/2008 | Calhoon | 398/106 |
| 2002/0042706 | A1 | 4/2002 | Rodriguez | |

(Continued)

OTHER PUBLICATIONS

International Search Report and Written Opinion for Int'l. patent appln. No. PCT/IB2009/051573 (Sep. 25, 2009).

*Primary Examiner* — Dalzid Singh

(57) ABSTRACT

Infrared control signals are communicated between an infrared remote control unit (16) and an infrared controlled device (18) via network gateways (14). A sub-network of a backbone network (10) is automatically set up prior to transmission of messages. The sub-network comprises a selection of devices coupled to a backbone network (10). The setting up of the sub-network comprises automatically sending out a request from the first one of the network gateways (14) to detect network gateways (14) that indicate ability to transmit infrared control messages prior to transmission of the message and storing information defining the sub-network in the first one of the network gateways dependent to a response to the request. Subsequently, when a first infra red control signal is received from the infrared remote control unit (16) at a first one of the network gateways (14), a message is transmitted dependent on information derived from the first infrared control signal from the first one of the network gateways (14) over the backbone network (10) to the subnetwork of the selected devices. The message from the backbone network (10) is received at a second one of the network gateways (14). The second one of the network gateways (14) transmits a second infrared control signal from to the infrared controlled device (18) dependent on information derived from the message. The information in the network message may comprise sample values of the demodulated infrared control signal.

19 Claims, 3 Drawing Sheets

(56) References Cited

U.S. PATENT DOCUMENTS

| | | |
|---|---|---|
| 2003/0088681 A1* | 5/2003 | Liscano et al. ............... 709/229 |
| 2003/0120763 A1 | 6/2003 | Volpano |
| 2004/0051625 A1 | 3/2004 | Nass |
| 2004/0157548 A1 | 8/2004 | Eyer |
| 2005/0018648 A1 | 1/2005 | Scheelke |
| 2006/0103767 A1 | 5/2006 | Kuo et al. |
| 2007/0019958 A1 | 1/2007 | Calhoon |
| 2008/0028430 A1 | 1/2008 | Kreiner et al. |
| 2009/0220243 A1* | 9/2009 | Petricoin et al. ............ 398/106 |
| 2010/0172287 A1* | 7/2010 | Krieter ......................... 370/328 |

* cited by examiner

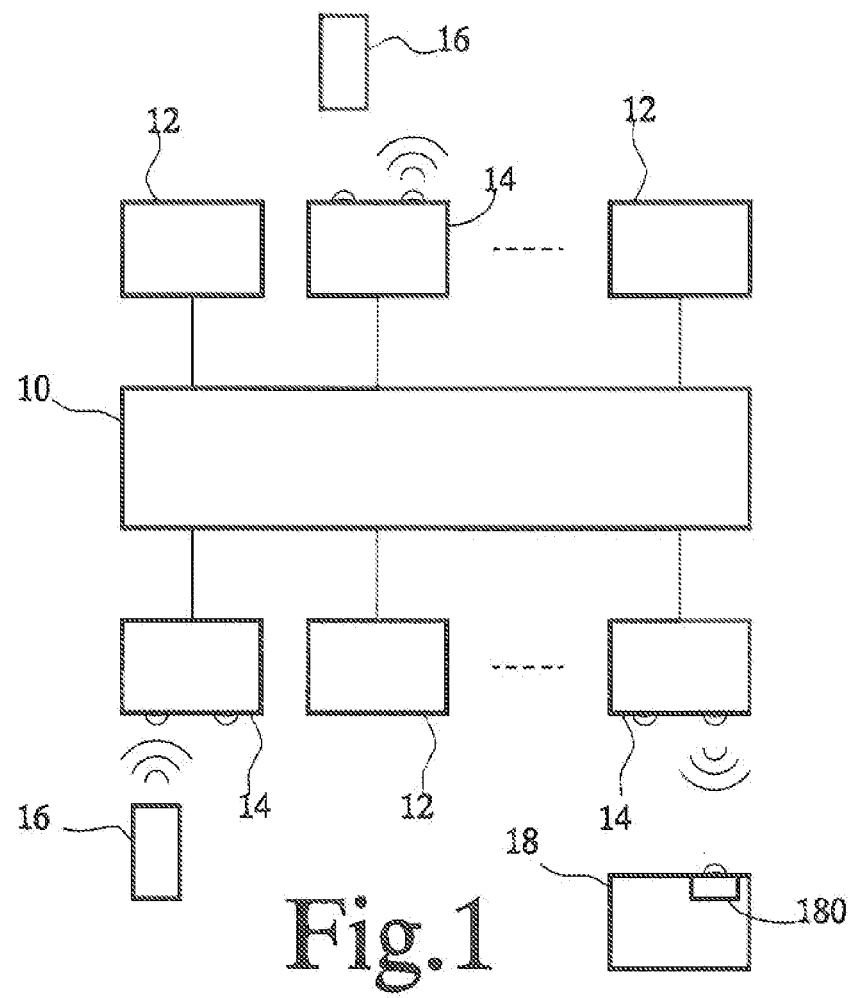
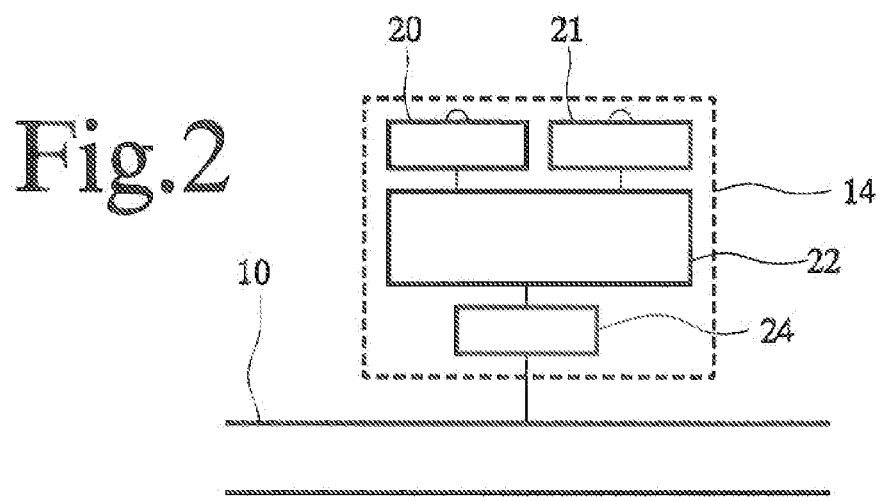

SYSTEM OF DEVICES OF WHICH SOME INCLUDE AN INFARED REMOTE CONTROL INTERFACE

FIELD OF THE INVENTION

The invention relates to a system of devices of which some include an infrared remote control interface, network gateway devices for use in such a system and a method of operating such a system.

BACKGROUND OF THE INVENTION

Many consumer devices, such as television sets, set-top boxes, media players etc have infrared (IR) remote control interfaces. Normally, this requires a user with a remote control unit to be in the same room as the device that the user wants to control.

US patent application No 2006/103767 describes a system that makes it possible to use a remote control unit in one room for controlling a device in another room. IR receiver gateways and repeater gateways connected via a network are used. When a receiver gateway detects a first IR remote control signal, it generates a network message with information from the first IR remote control signal and sends the message over the network. The repeater gateway receives the message from the network and generates a second IR remote control signal with information from the message. The receiver and repeater gateways are located in different rooms. A device with a remote control input in the same room as the IR receiver gateway receives and responds to the second IR remote control signal.

Typically a general purpose in-house network is used, that also serves other devices such as personal computers, internet gateways, printers, mass storage devices etc. The network may also be used to pass video and audio between devices in the house. The need to manually configure gateways in such a network for the purpose of enabling IR remote control between different rooms can be burdensome, especially for technically inexperienced persons. This can be partly overcome by the use of broadcast messages for transmitting information from IR remote control signals over the network. This simplifies configuration by avoiding the need to program addresses. However, it also burdens all devices with the task of interpreting the messages and it makes it impossible to keep repeater gateways from repeating messages with information IR commands.

SUMMARY OF THE INVENTION

Among others, it is an object to provide for a networked system of devices with an infrared remote control interfaces wherein configuration is simplified without burdening unrelated network devices.

A system according to claim 1 is provided. Herein a backbone network is used that is coupled to devices, part of which are network gateway devices with infrared remote control communication capability. The network gateway devices may communicate with hand-held remote control units and consumer devices such as television sets, audio/video recording devices, TV-channel tuners, set-top boxes etc.

On start-up the control circuits of network gateway devices initiate mutual identification of the network gateway devices, so that a sub-network of network gateway devices for repeating infrared remote control messages is automatically formed. Mutual identification may include sending a request to all devices coupled to the network, requesting network gateway devices capable of infrared remote control communication to provide their network addresses, or setting up a multicast group addresses and subscribing these network gateway devices to that multicast group address. When a network gateway device subsequently receives an infrared remote control signal it uses the information gathered during the initial start up to broadcast a message dependent on the infrared remote control signal to network gateway devices on the sub-network, which use the message to transmit infrared secondary remote control signals.

Thus, repetition of infrared remote control messages is realized with the aid of a general purpose backbone network with other network devices such as PCs, without a need for the user to configure the network gateway devices.

In an embodiment the control circuits include information representing samples of the demodulated first infrared remote control signal in the backbone network message, and the secondary infrared remote control signal dependent on said samples. Thus no data needs to be decoded from the infrared remote control signals. The modulation pattern of the infrared remote control signals (e.g. the envelope amplitude) is merely transmitted and copied.

In an embodiment the network gateway devices perform transmission of the message or the second infrared remote control signal dependent on whether type information associated with the first infrared remote control signal matches the type information stored in the network gateway device. Thus, different infrared remote control signals may be distributed differently based on their type, without requiring specific address information from the remote control signals.

In an embodiment the network gateway devices detect whether infrared response signals are received and transmit a response messages over the backbone network back to the source of the original infrared remote control signal. In this way it is made possible to support two-way communication between remote control units and infrared controlled devices.

BRIEF DESCRIPTION OF THE DRAWINGS

These and other objects and advantageous aspects will become apparent from a description of exemplary embodiments, using the following Figures.

FIG. 1 shows a system with a backbone network
FIG. 2 shows an infrared remote control gateway

DESCRIPTION OF EXEMPLARY EMBODIMENTS

Figure 3:
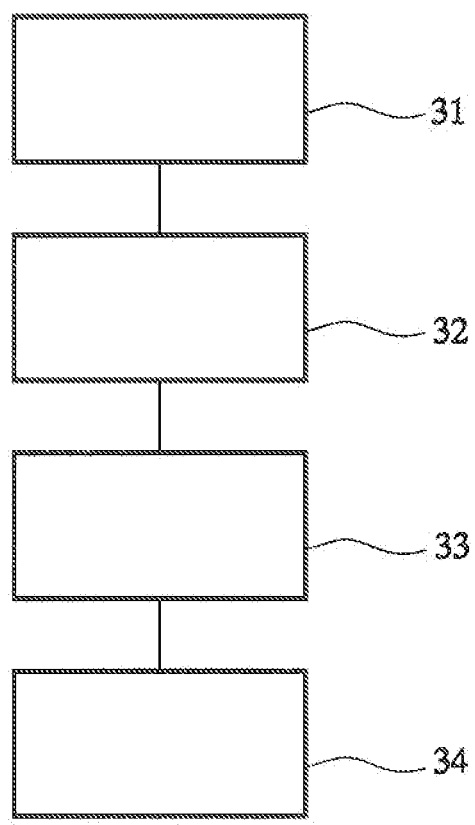
FIG. 3 shows a flow-chart of a configuration process

FIG. 1 shows a system with a backbone network 10, a plurality of devices 12, 14 coupled to backbone network 10, the gateways including infrared remote control gateways 14, an infrared remote control unit 16 and a target device 18 with an infrared control interface 180. Backbone network 10 may be a wired network or a wireless RF network or a combination of one or more of these for example. Devices 12 may include personal computers, printers, mass storage devices, internet gateways etc., which need not have any infrared command interface.

FIG. 2 shows an infrared remote control network gateway 14, comprising an infrared transmitter 21, an infrared receiver 20, a control circuit 22 and a backbone network interface 24. Control circuit 22 is coupled to infrared transmitter 21, infrared receiver 20 and backbone network interface 24. Backbone network interface 24 is coupled to backbone network 10.

Gateways 14 are configured to establish a sub-network of gateways 14 within the larger context of the backbone network 10. Infrared signals are repeated using this sub-network.

In an embodiment, control circuit 22 is configured to represent a list of addresses of gateways 14 that have signaled a capability to transmit infrared command signals or a multicast address of a group of such gateways 14. Control circuit 22 is configured to receive infrared command information from infrared receiver 20 and to control backbone network interface 24 to transmit messages based on the infrared command information to the addresses on the list or to the multicast group address. Control circuit 22 may comprise a programmable instruction processor and a program memory with a program of instructions for execution by the instruction processor to control these functions. Alternatively control circuit 22 may comprise a specially designed circuit, designed to the functions. In addition control circuit 22 may be configured to receive messages with infrared command information from backbone network interface 24 and to control infrared transmitter 21 to transmit an infrared command signal based on the message in response to reception.

In operation, a user operates buttons on infrared remote control unit 16. Infrared remote control unit 16 detects operation of the buttons and transmits infrared control signals in response. This is known per se. In infrared remote control network gateway 14, infrared receiver 20 receives the infrared control signals and derives information from each signal. As used herein "deriving information" may encompass both copying the information from the signal or use of part of the signal as input for a function to compute the information, in which case the information need not be a copy of any information in the signal. The derived information is supplied to control circuit 22.

Control circuit 22 uses the information to form a message and causes backbone network interface 24 to transmit the message to the addresses on the list of addresses of gateways that have signaled a capability to transmit infrared command signals, or to the multicast group address. The transmission may be realized by transmitting a plurality of messages, with respective addresses from the list, or a multicast message with a group address that is associated with the addresses on the list. In both cases, the message is effectively broadcast to all devices on a sub-network of all infrared remote control gateways 14.

In an embodiment infrared receiver 20 is configured to perform analog demodulation of the infrared signals (e.g. to detect the amplitude of the IR signal as a function of time) and to sample the demodulated signal. In this embodiment control circuit 22 places information representing the samples in the backbone network message. The control circuit 22 of the receiving gateway controls its infrared transmitter to control the modulation the transmitted infrared signal according to the samples. In this case there is no need to decode control data from the modulation. Because of the broadcast over the sub-network no further information is needed.

The infrared remote control gateways 14 receive the message and control their infrared transmitter 21 to transmit infrared control signals dependent on information derived from the message. At least one of these messages is received by infrared control interface 180 of target device 18, in response to which target device 18 performs some action dependent on the infrared control signal.

Infrared remote control gateways 14 are arranged perform configuration of the list of addresses of infrared remote control gateways 14, or the multicast group, automatically. In an embodiment the control circuit 22 of each infrared remote control network gateway 14 is configured to start configuration in response to a start up event signal, for example after switch on of the power supply of the infrared remote control network gateway 14.

In an embodiment the control circuit 22 of each gateway has a memory storing configuration fields which allow it to define a profile. These fields are used by the gateway during transmission and reception of messages of the backbone network 10. These fields may include fields for:

a Network Type e.g. WLAN, wired network etc.
Broadcast type (assigned to IR network name)

The network type field identifies the type of backbone network infrastructure. This allows the gateway to generate/receive the packet in right format which is compatible with the network type. This can either be set up by user using the manual switch or can be identified by gateway automatically. This allows one type of infrared remote control network gateway 14 to use a plurality of different backbone infrastructures as long as the two networks can communicate with each other. An example is a wired network plus a WLAN. In this case, some gateways can be connected to the wired backbone network and some other can be connected to a WLAN.

The broadcast type field comprises an identifier to distinguish the sub-network formed by the infrared remote control gateways 14 from other similar sub-networks. In an embodiment this field can be set by the user, to define a sub-network identifier of a new sub-network. In simple systems a predetermined sub-network identifier may be used.

FIG. 3 shows a flow-chart of a configuration process. In a first step 31 control circuit 22 waits for an event signal. When the event signal is received a second step 32 is executed wherein control circuit 22 causes backbone network interface 24 to send requests or broadcast a request to other infrared remote control gateways 14 to report back if they have the same sub-network identifier. In response to this request the other infrared remote control gateways 14 send response messages, including their address, or a multicast group address of the gateways 14.

In a third step 33 control circuit 22 receives back the backbone network addresses of these gateways 14, or the multicast group address. In a fourth step 34 control circuit 22 records the backbone network addresses or the multicast group address for use during transmission of messages dependent on information derived from infrared command signals. When a multicast group address is used and no response is received, control circuit 22 sets up a new multicast address.

Control circuit 22 is configured to respond to the requests generated by other gateways 14 when these execute second step 32. When it receives a request from such a gateway for a sub-network identifier that is stored in the control circuit 22, it sends back a response message, including its network address, or a multicast group address of the gateways 14 and optionally the sub-network identifier. In addition it may record the address of the gateway that sent the request in its list for the sub-network identifier.

Thus, a sub-network for broadcasting messages in response to received infrared commands is automatically established. When the user desires to create a plurality of disjoint networks of this type, the user may program different sub-network identifiers for the respective sub-networks into the gateways. Thus, for example in within a family it can be avoided that remote controls of parents and children interfere, or such interference can be avoided in a network of an apartment building.

In an embodiment control circuit 22 is configured to respond conditionally to the requests generated by other gateways 14 when these execute second step 32. The condition may depend on previous programming by the user. In this embodiment control circuit 22 is configured to receive a previous programming signal from the user, entered for example using a remote control device and infrared receiver 20 or using a pushbutton (not shown) on the gateway 14 that contains the control circuit 22, to enable the gateway to respond to the requests according to second step 32. In response to the previous programming signal information may be stored in control circuit 22 indicating that such a signal has been received (similarly the control circuit may be configured to reset the information in response to a user signal). In this embodiment the control circuit 22 is configured to respond to requests according to second step 32 only if it has previously received such a programming signal. This makes it possible for the user to selectively activate gateways 14 that are located in a room with a remotely controllable device, such as a recording/playback device (not shown) to join the virtual sub-network of infrared gateways.

In another embodiment wherein a transponding target device 18 is used, which returns acknowledge signals or other signals in response to reception of infrared control signals, the sub-network may also be used to return infrared response signals in response to infrared control signals. In this embodiment an infrared remote control network gateway 14 that receives a broadcast message over the sub-network is configured to perform the following steps. First the control circuit 22 of the infrared remote control network gateway 14 controls its infrared transmitter 21 to transmit a first infrared control signal dependent on information derived from the message. Next control circuit 22 tests whether its infrared receiver 20 has received a second infrared signal that is or may be a response to the first infrared control signal. For example a test may comprise testing whether the second infrared signal contains information identifying it as a response, or testing whether the second infrared signal is received within a predetermined time interval after transmitting the first infrared control signal).

If control circuit 22 detects that infrared receiver 20 has received a second infrared signal that is or may be a response to the first infrared control signal, control circuit 22 executes a network transmission step. In this set control circuit 22 causes the backbone network interface 24 of its infrared remote control network gateway 14 to transmit a further backbone network message addressed to the source of the broadcast message. Optionally, the control circuit inserts information dependent on information derived from the second infrared signal in the further backbone network message.

The control circuit 22 of the infrared remote control network gateway 14 at the source of the broadcast message is configured to respond to such a further backbone network message by causing its infrared transmitter 21 to transmit a third infrared signal optionally including information dependent on information derived from the further backbone network message. Thus the remote control unit 16 may receive back response signals from a target device 18 that is not within its view.

This form of communication requires the use addresses of individual gateways. Backbone network addresses may be used, or special sub-network addresses. Alternatively, the further backbone network message may be broadcast over the sub-network. In this case all gateways 14 may be configured to respond by transmitting equivalents of the third infrared signal. Alternatively, the control circuit 22 of the infrared remote control network gateway 14 may be configured to test whether the further backbone network message is a response to a message sent from the control circuit 22 and to transmit the third infrared signal only if this is the case (a test for identifying a response may include inspecting whether the further backbone network message contains information identifying it as a response, or testing whether the further backbone network message is received within a predetermined time interval after transmitting the first infrared control signal).

Various techniques may be used to establish addresses of gateways in the sub-network. In a further embodiment the configuration fields include a Local Gateway ID and Total Gateway Count in the sub-network. In this embodiment each gateway has its own gateway ID which may be a number between 1 and 255, for example. The local gateway ID field is the gateway identification number on the sub-network. In this embodiment, the requests of second step 32 may include a request to the other gateways to report back their Total Gateway Count and fourth step 34 may include setting the "Total Gateway Count" field and the "Local Gateway ID" field to the highest received "Total Gateway Count" plus one. Thus unique Local Gateway ID values will be assigned. Preferably all gateways increment their "Total Gateway Count" after they have responded to the request for the gateway count. Thus the total gateway count field is updated as soon as a new infrared remote control network gateway 14 is found on the network. This is maintained by a counter in each infrared remote control network gateway 14. This field helps in maintaining a unique gateway number for each infrared remote control network gateway 14.

In an embodiment a plurality of sub-networks may be formed, including possibly different, and possibly partly overlapping, groups of gateways 14. In a further embodiment that supports this, at least one of the gateways has a plurality of "broadcast type" fields, for a plurality of different sub-networks that it may be part of. In this embodiment control circuit 22 causes backbone network interface 24 to send requests to other infrared remote control gateways 14 second step 32, to report back if they have the same sub-network identifier, for each of the network identifiers that is stored in the control circuit 22. For each sub-network identifier each other infrared remote control network gateway 14 sends back a response, referring to the sub-network identifier, if the other infrared remote control network gateway 14 has the sub-network identifier stored in its broadcast type field or fields (as used herein "referring" may include specifying the sub-network identifier in the response or responding within a predetermined time after a request specifying a sub-network identifier). In fourth step 34 the requesting gateway with a plurality of "broadcast type" fields records a respective list of backbone network addresses for each of the broadcast types, each list including backbone network addresses of the gateways that have reported with reference to the corresponding sub-network identifier.

In an embodiment, control circuit 22 with a plurality of "broadcast type" fields is configured to send backbone network messages with information derived from an infrared remote control signal, in response to reception of an infrared remote control signal, to gateways 14 of all sub-networks for which control circuit 22 has a stored broadcast type.

In another embodiment control circuit 22 selects one of the broadcast type fields dependent on the type of infrared control signal received. In one example, infrared receiver 20 may be configured to receive infrared control signals according to a plurality of different infrared transmission protocols and/or infrared wavelengths. In this example control circuit 22 stores information relating infrared transmission protocols to broadcast type. In this case, infrared receiver 20 is configured to detect and report the type of infrared transmission protocol and/or wavelength to control circuit 22. Control circuit 22 responds to the report by transmitting a backbone message or backbone messages to the gateways 14 that belong to the broadcast type that is related to the infrared transmission protocol by the stored information.

Optionally, control circuit 22 may be configured to re-activate first step 31 unrelated to switch on of the power supply, and generate the event required by said step. For example control circuit may do so periodically if it has not yet received a response from any other gateway or if subsequently it detects a request of the type mentioned in relation to second step 32 from another infrared remote control network gateway 14.

In an embodiment, a transponding target device 18 is used, which returns acknowledge signals in response to reception of infrared control signals. In this case control circuit 22 may send out probe signals to determine in advance whether there is any target device of a broadcast type in view. Control circuit 22 records this. Subsequently, control circuit generates backbone messages in response to infrared signals only if it has previously recorded that a target device is in view.

In this embodiment control circuit 22 normally joins the sub-network on start-up, irrespective of whether a response is received, but it does not respond to backbone messages by causing infrared control signals to be transmitted unless it has previously received a response to a probe signal. Alternatively an infrared remote control network gateway 14 may not join a sub-network when it does not detect the presence of a transponding target device 18.

Figure 4:
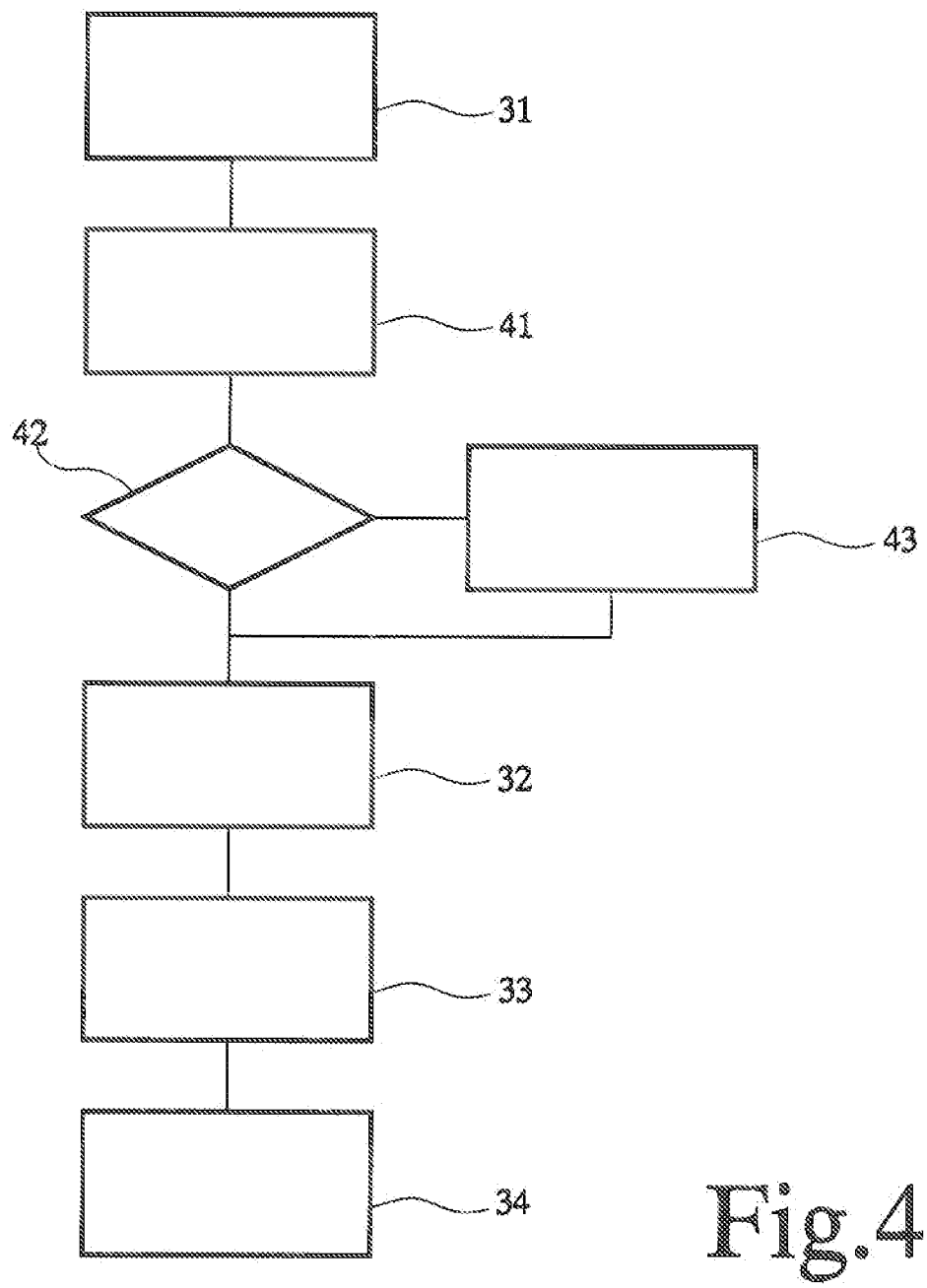
FIG. 4 shows a further flow chart of operation

FIG. 4 shows a flow chart of operation of a control circuit 22 of a gateway of a version of this embodiment. A first and second intermediate step 41, 42 have been added between first step 31 and second step 32. In first intermediate step 41 control circuit 22 causes infrared transmitter 21 to send out an infrared probe signal. In second intermediate step 42 control circuit 22 tests whether infrared receiver has received a response to the probe signal. If so, control circuit 22 proceeds to second step 32. If not control circuit 22 enters a further step 43, where it waits for detection of an infrared signal from a remote control unit 16. When such a signal is detected control circuit 22, proceeds to second step 32. In this way unnecessary transmissions are avoided. While waiting in further step 43, control circuit 22 may attend to other functions or suspend operation. Optionally, control circuit 22 causes the process to repeat periodically from first intermediate step 41.

It should be noted that other network devices 12, which do not have infrared remote control interfaces, may also use the sub-network, by sending network messages to the gateway devices 14 as if these messages have been formed in response to infrared remote control signals. In this way network devices 12 that do not have infrared remote control interfaces may control infrared controlled devices.

Although an embodiment has been described wherein an infrared remote control network gateway 14 includes the identifier indicating the broadcast type in the request to other gateways, it should be understood that other methods may be used to realize requests and responses that correspond to a same broadcast type. For example, a general request, independent of a specific broadcast type, may be sent from an original infrared remote control network gateway 14 and the responses to this request may include an identifier identifying a broadcast type of the responding gateways 14. In this case, original infrared remote control network gateway 14 may record addresses of gateways in a list for a broadcast type on condition that the identifier corresponds to the broadcast type of the list.

Although an embodiment has been described wherein each infrared remote control network gateway 14 has both an infrared signal receiver 20 and an infrared signal transmitter 21, it should be appreciated that alternatively some network gateways 14 may have only either an infrared signal receiver 20 or an infrared signal transmitter 21. In this case, messages due to incoming infrared remote control signals need be broadcast only to the network gateways 14 that have an infrared signal transmitter 21. Similarly only network gateways 14 that have an infrared signal receiver 20 need information to identify addresses of network gateways to which messages due to incoming infrared remote control signals need be broadcast. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of communicating between an infrared remote control unit and an infrared controlled device via network gateways, the method comprising
receiving a first infrared control signal from the infrared remote control unit at a first one of the network gateways;
transmitting a message dependent on information derived from the first infrared control signal from the first one of the network gateways over a backbone network to network gateways in a predefined sub-network;
receiving the message from the backbone network at a second one of the network gateways;
transmitting a second infrared control signal from the second one of the network gateways to the infrared controlled device dependent on information derived from the message;
automatically setting up the sub-network of the backbone network prior to transmission of the message and broadcasting the message to all devices in the sub-network, the sub-network comprising a selection of devices coupled to a backbone network, the selection comprising the network gateways, the setting up of the sub-network comprising:
automatically sending out a request from the first one of the network gateways to detect network gateways that indicate an ability to transmit infrared control messages prior to transmission of the message; and
storing information defining the sub-network in the first one of the network gateways dependent to a response to the request.

2. A method according to claim 1, further comprising:
demodulating the first infrared control signal,
sampling the demodulated first infrared control signal, including information representing samples of the demodulated first infrared control signal in the message, and
modulating the second infrared control signal to generate a copy of the first infrared control signal under control of said information representing the sample, without using data decoded from the first demodulated infrared control signal.

3. A method according to claim 1, further comprising:
providing for storage of user programmable information in at least one of the network gateways to indicate whether the at least one of the network gateways is enabled to join the sub-network, and
responding to the request to indicate an ability to transmit infrared control messages only if the information has been programmed to indicate enablement.

4. A method according to claim 1, further comprising:
providing type information in the network gateways; and
performing said storing selectively for a response corresponding to the type information provided in the first one of the network gateways.

5. A method according to claim 4, further comprising:
including an identifier representing the type information in the request, and sending responses only from network gateways in which type information corresponding to the identifier is provided.

6. A method according to claim 4, further comprising:
providing the type information for a plurality of types in the first one of the network gateways,
sending the request or requests for respective ones of the type, and
storing information defining respective sub-networks for each of the types in the first one of the network gateways, dependent to a response to the request or requests.

7. A method according to claim 1, further comprising:
detecting whether a first infrared response signal is received at the second one of the gateways, in response to a second infrared control signal;
transmitting a response message from the second one of the network gateways addressed to the first one of the network gateways, dependent on the first infrared response signal; and
transmitting a second infrared response signal from the first one of the network gateways, dependent on the response message.

8. A method according to claim 7, further comprising:
detecting whether at least one of the first infrared response signal and the response message is a response to the second infrared control signal, and
making transmission of at least one of the response message and the second infrared response signal dependent on said detection.

9. A method according to claim 1, further comprising:
sending an infrared probe signal from the second one of the network gateways,
detecting whether the second one of the network gateways receives a response to the infrared probe signal, and
disabling a response to the request if no response to the infrared probe signal has been received.

10. A computer program product comprising a non-transitory computer-readable medium having data that represents a program of instructions for a programmable control circuit that, when executed by the programmable control circuit cause the programmable control circuit to perform the steps of the method of claim 1 performed by the first one of the network gateways.

11. A computer program product comprising a non-transitory computer-readable medium having data that represents a program of instructions for a programmable control circuit that, when executed by the programmable control circuit cause the programmable control circuit to perform the steps of the method of claim 1 performed by the second one of the network gateways.

12. A system comprising a plurality of networked devices coupled via a backbone network, wherein part of the networked devices are network gateway devices, each network gateway device comprising:
a network interface coupled to the backbone network;
at least one of an infrared signal receiver and an infrared signal transmitter;
a control circuit. coupled to the network interface of the network gateway device and to he infrared signal receiver and the infrared signal transmitter, whichever is comprised in the network gateway device, the control circuit of at least part of the network gateway devices being configured to initiate mutual identification of the network gateway devices on start-up;
the control circuit of the network gateway device or devices that comprise the infrared signal receiver being configured to respond to subsequent reception of a first infrared remote control signal from the infrared signal receiver of the network gateway device by broadcasting a message over the backbone network, dependent on information derived from the first infrared remote control signal, to all previously identified network gateway devices that comprise the infrared signal transmitter;
the control circuit of the network gateway device or devices that comprise the infrared signal transmitter being configured to respond to the message by causing the infrared signal transmitter of the network gateway device to transmit a second infrared remote control signal dependent on information derived from the message.

13. A system according to claim 12, wherein the infrared signal receivers of the network gateway devices are configured to demodulate the first infrared remote control signal and to sample the demodulated first infrared remote control signal and wherein the control circuits of the network gateway devices with an infrared signal receiver are configured to include information representing samples of the demodulated first infrared remote control signal in the message, and the control circuits of the network gateway devices with an infrared signal transmitter are configured to cause the infrared signal transmitters to modulate the second infrared remote control signal dependent on said samples.

14. A system according to claim 12, wherein the control circuit of at least one of the network gateways is configured to store user programmable information in to indicate whether the at least one of the network gateways is enabled to join the at least one of the network gateways which are configured only if the information has been programmed to indicate enablement.

15. A system according to claim 12, wherein each network gateway device comprises a memory storing type information, the control circuits of the network gateway devices being configured to perform transmission of the message or the second infrared remote control signal dependent on whether type information associated with the first infrared remote control signal matches the type information stored in the memory of the network gateway device.

16. A network gateway device for use in a system with a plurality of networked devices coupled via a backbone network, wherein at least part of the networked devices are further network gateway devices with an infrared transmitter, the network gateway device comprising:
a network interface coupled to the backbone network;
an infrared signal receiver;

a control circuit, coupled to the network interface and to the infrared signal receiver, the control circuit being configured to initiate mutual identification of the network gateway device and the further network gateway devices to form a virtual sub-network on start-up of the network gateway device, and to respond to subsequent reception of a first infrared remote control signal from the infrared signal receiver by broadcasting a message over the backbone network, dependent on information derived from the first infrared remote control signal, to all previously identified further network gateway devices.

17. A network gateway device according to claim 16, wherein the infrared signal receiver is configured to demodulate the first infrared remote control signal, and to sample the demodulated first infrared remote control signal, and wherein the control circuit is configured to include information representing samples of the demodulated first infrared remote control signal in the message, without including control data decoded from the first demodulated infrared remote control signal.

18. A network gateway device according to claim 16, comprising an infrared signal transmitter, wherein the control circuit is configured to detect a response message in response to said broadcast message and to make the infrared signal transmitter transmit a response infrared signal, dependent on information derived from the detected response message.

19. A network gateway device for use in a system with a plurality of networked devices coupled via a backbone network, wherein part of the networked devices are further network gateway devices with an infrared receiver, the network gateway device comprising:
- a network interface for coupling to the backbone network;
- an infrared signal transmitter;
- a control circuit, coupled to the network interface and to the infrared signal transmitter, the control circuit being configured to initiate selective mutual identification, to automatically form a sub-network different than the backbone network, including the network gateway device and the further network gateway devices on start-up of the network gateway device, and to respond to messages from the further network gateway devices by causing the infrared signal transmitter to transmit a second infrared signal dependent on information derived from the message.

\* \* \* \* \*